April 30, 1968 W. J. ACHRAMOWICZ ET AL 3,381,087

TELETYPEWRITER TO TRANSMITTER CONVERTER

Filed April 14, 1964 3 Sheets-Sheet 1

INVENTORS
WILLIAM J. ACHRAMOWICZ
AND STANWOOD AYER
BY
Wade Koontz
George Fine
ATTORNEYS INVENTORS
WILLIAM J. ACHRAMOWICZ
AND STANWOOD AYER
BY
Wade Koontz
George Fine
ATTORNEYS INVENTORS
WILLIAM J. ACHRAMOWICZ
AND STANWOOD AYER
BY
Wade Koontz
George Lintner
ATTORNEYS 3,381,087
Patented Apr. 30, 1968

3,381,087

TELETYPEWRITER TO TRANSMITTER CONVERTER

William J. Achramowicz, Leicester, and Stanwood Ayer, Lexington, Mass., assignors to the United States of America as represented by the Secretary of the Air Force Filed Apr. 14, 1964, Ser. No. 359,802
1 Claim. (Cl. 178—26)

ABSTRACT OF THE DISCLOSURE

Teletypewriter non-synchronous code to synchronous code converter having a pulse train generator controlled by a teletypewriter relay fed into a shift register and alternately transferring the data to two storage registers. A ring counter controls the storage register reset and read-out at frequency determined by clock pulses fed into the ring counter.

The invention described herein may be manufactured and used by or for the United States Government for governmental purposes without payment to us of any royalty thereon.

This invention relates to communication systems utilizing synchronous operation of the five unit data-defining elements of a teletypewriter code. More particularly, this invention accepts the continuous non-synchronous coded output from a teletypewriter, drops the "start" space and "stop" mark, and changes its frequency; the output of the device is then fed to a transmitter.

The theory of synchronous communication utilizing radio telegraphy for low noise reception has been applied in many types of apparatus to provide a high reliability communication network. This invention pertains to a synchronous communication system where the output of a teletypewriter, consisting of a 22 millisecond "start" space, five 22 millisecond data-defining information marks or spaces, and a 31 millisecond "stop" mark, is converted to a synchronous output with the "start" space and "stop" mark omitted and the length of each information position increased to 30 milliseconds. Thus, any single teletypewriter character is converted to an information band 150 milliseconds wide made up of marks and spaces each 30 milliseconds wide; two consecutive characters are converted to an information band 300 milliseconds wide without "start" spaces or "stop" marks.

It is accordingly one object of this invention to provide an electronic code converter to accept the continuous non-synchronous output of a teletypewriter, omit the "start" space and "stop" mark, and change the frequency of the data-defining elements.

It is a further object of this invention to provide a transistorized converter which is compact, light weight, and requiring low power consumption.

Figure 1:
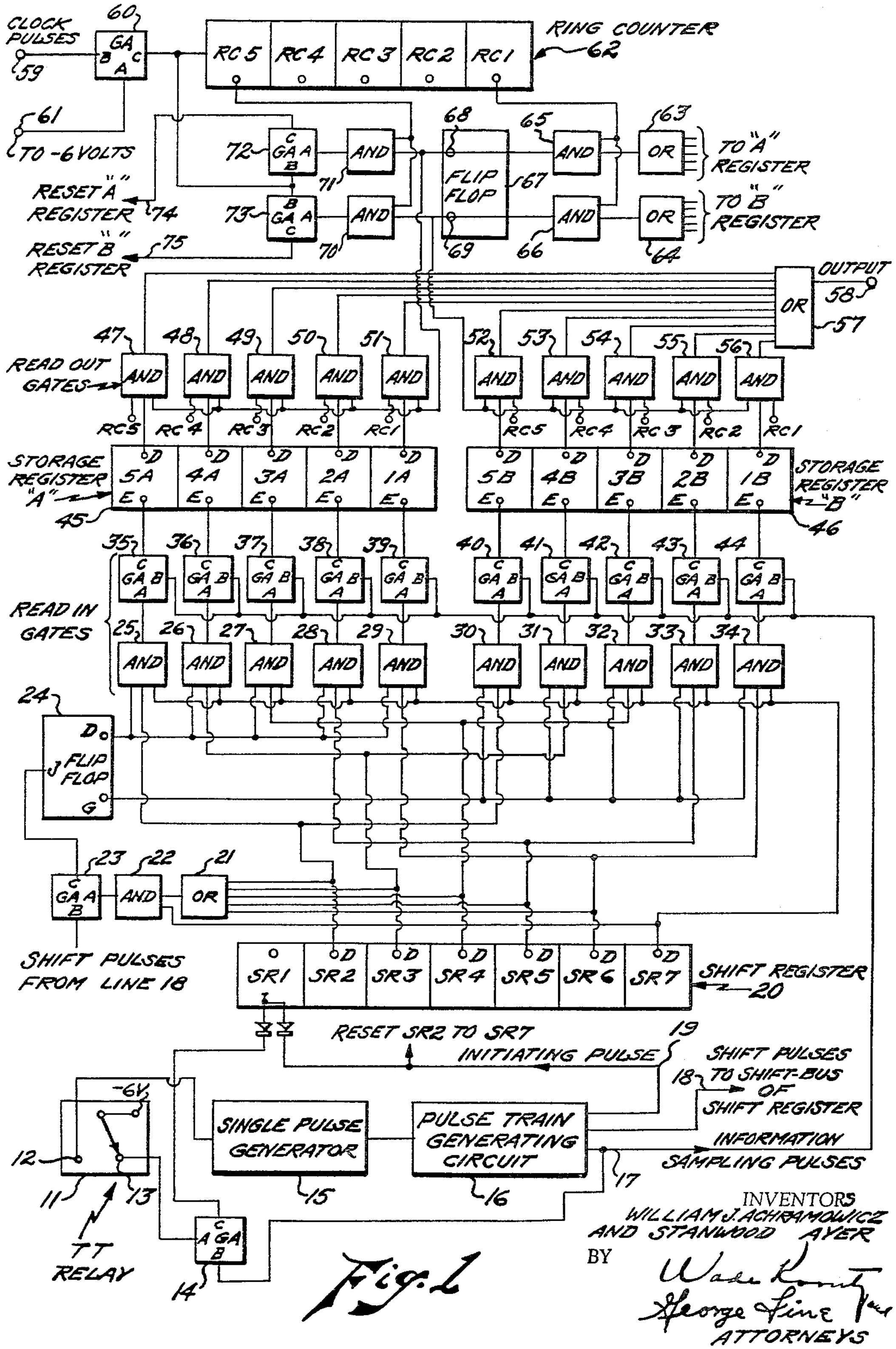
Figure 2A:
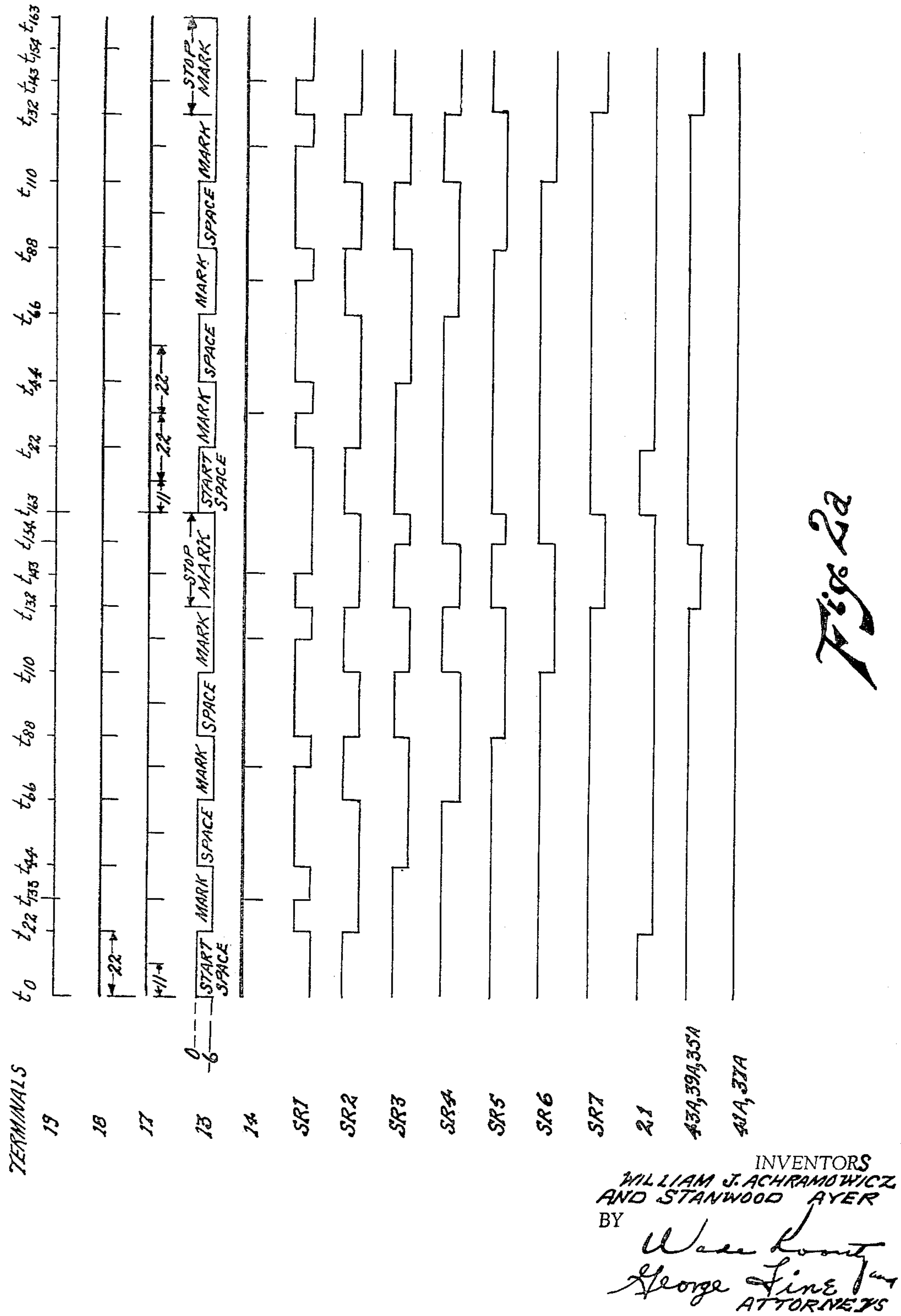
Figure 2B:
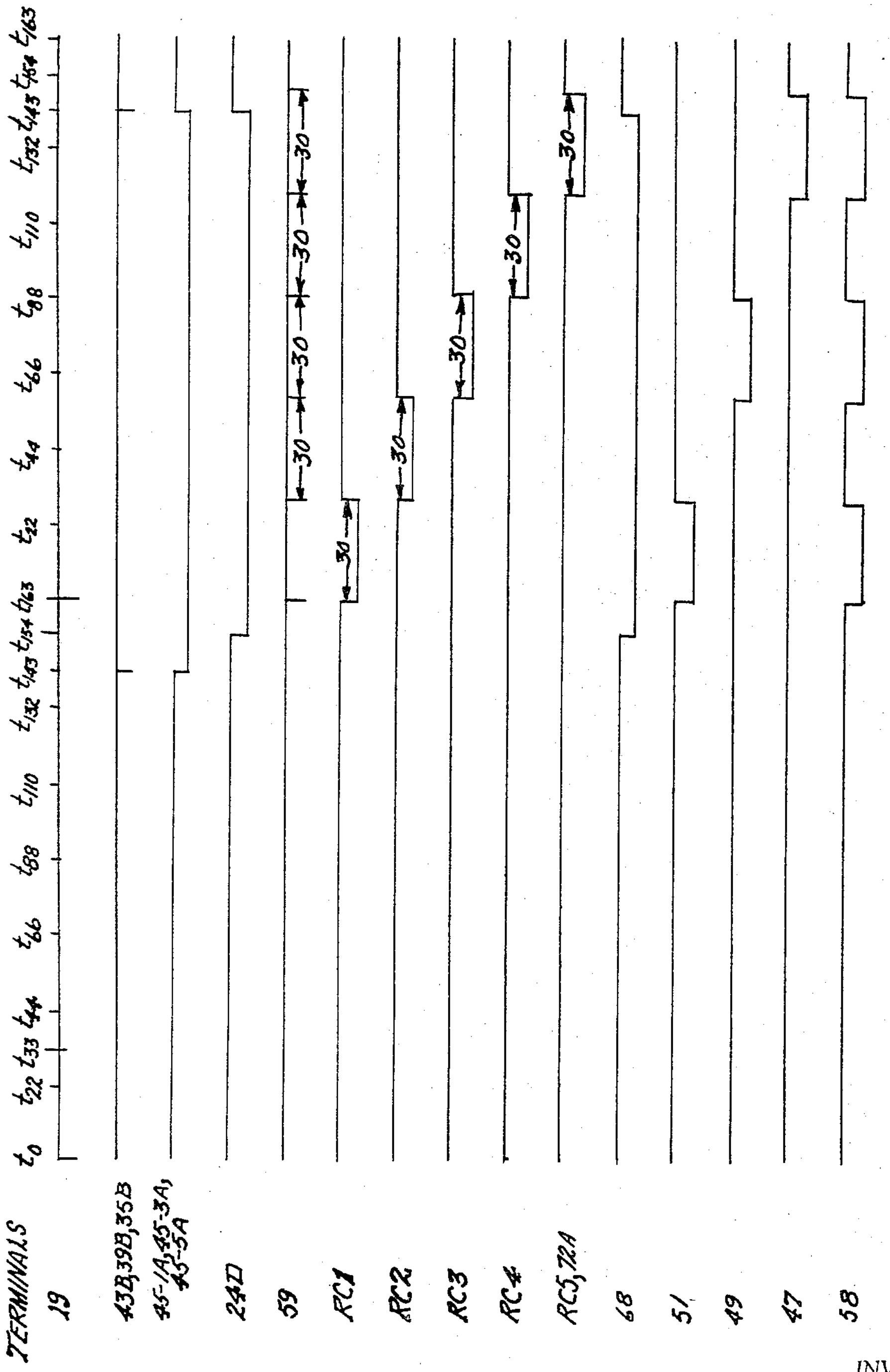

Other features and advantages not enumerated will become apparent from the following detailed descriptions and appended claim, when read in the light of the attached drawings of which:

FIGURE 1 is a schematic diagram showing the essential parts of the invention and their interconnection;

FIGURES 2*a* and 2*b* are a series of correlated wave forms at various terminals of FIGURE 1;

The general method of operation of the converter will be described with reference to the block diagram of FIGURE 1 and the timing diagrams of FIGURE 2.

In FIGURE 1, teletypewriter relay 11 provides two outputs from terminals 12 and 13; terminal 12 is connected to single pulse generator 15 which is used to activate pulse train generating circuit 16, while terminal 13 is used to enable gated amplifier 14; pulse train circuit 16 has three outputs, an output of a single pulse on line 19 to reset shift register 20 to an initial condition, an output of seven pulses on line 18 to provide shift pulses for shift register 18, and a seven pulse output on line 17 to provide an input to gated amplifiers 14 and 35 to 44; the output of gated amplifier 14 provides the information input to the shift register. "Or" gate 21 is activated by stages 2 to 6 of shift register 20 to provide one input to "and" gate 22, the other input of which is connected to stage 7 of shift register 20. The output of "and" gate 22 is used to enable gated amplifier 23 which is fed by shift pulses from line 18 of pulse train generating circuit 18; the output of gated amplifier 23 is used to switch flip-flop 24 and therefore determines which storage register receives the information from the shift register. "And" gates 25 to 29 and 30 to 34 are used to enable gated amplifiers 35 to 39 and 40 to 44 respectively. The "and" gates are triple coincidence circuits activated by one side of flip-flop 24, a stage of shift register 20, and the seventh stage of shift register 20.

Gated amplifiers 35 to 39 are used to place the information from shift register 20 to flip-flops 5A to 1A of storage register 45, while amplifiers 40 to 44 place this information into flip-flops 5B to 1B of storage register 46.

Synchronizing clock pulses are applied at terminal 59, and a −6 volts enable voltage is applied at terminal 61, allowing the clock pulses to pass through gated amplifier 60 to drive ring counter 62. One stage of ring counter 62 is used as an input to each bank of "and" gates, stage RC5 of ring counter 62 feeding into "and" gates 47 and 52, stage RC4 to gates 48 and 53, RC3 to gates 49 and 54, RC2 to gates 50 and 55, and RC1 to gates 51 and 56; terminal 68 of flip-flop 67 is connected to the input of gates 47 to 51, and terminal 69 is connected to the input of gates 52 to 56; the third input to each gate is connected to one stage of a storage register, register 45 connected to gates 47 to 51, and register 46 to gates 52 to 56; the output of the "and" gates is the input to "or" gate 57, which provides an output to terminal 58, which in turn provides the output to a transmitter.

Flip-flop 67 provides an input to "and" gates 70 and 71, with another input to each gate connected to RC5 of ring counter 62. The output of "and" gates 70 and 71 is used to enable gated amplifiers 73 and 72 respectively, which in turn provide a reset pulse to storage registers 46 and 45. "Or" gates 63 and 64 are activated by the contents of storage registers 45 and 46 respectively; the outputs of these gates provide one input to "and" gates 65 and 66, the other input of which is provided by stage RC1 of ring counter 62; the outputs of these "and" gates are used to switch terminals 68 and 69 of flip-flop 67 respectively.

The general method of operation is as follows: the output of a teletypewriter is series fed to a shift register, thus placing the data-defining elements of a particular teletypewriter character into the shift register. The contents of the shift register are alternately transferred to one of two storage registers, from which the data-defining elements are read out at a frequency determined by the clock frequency applied to drive the read-out ring counter.

In the following description of the operation of this circuit, the terminology used is as follows: a flip-flop refers to a bistable multivibrator which can exist indefinitely in either of two stable states and can be caused to make an abrupt transition from one state to the other upon application of a pulse to either terminals E, F, or J; the "high" or the enable side of a flip-flop refers to terminals D or G which are at −6 volt potential while a disable or "low" side of a flip-flop refers to these terminals when they are at 0 volt potential. The pulse input terminals of a flip-flop are at E, F, and J; a pulse applied at terminal E of a flip-flop will cause terminal D to switch to −6 volts, unless terminal D is initially at −6 volts, in which case no change will occur in the state of the flip-flop. A pulse applied at terminal F will cause terminal G to switch to −6 volts, unless terminal G is at the −6 volt potential initially. Terminal J is the complementary pulse input terminal of the flip-flop; a pulse applied at terminal J will cause the flip-flop to change state regardless of the initial state of the flip-flop.

In the gated amplifier, the pulse input terminal is at B, the pulse output terminal is at C, while a voltage enable level from a flip-flop or gate is applied at terminal A. An enable voltage of −6 volts applied at terminal A will allow passage of a pulse through the amplifier, while a disable voltage of 0 volt at terminal A will prevent any pulse from passing through the amplifier. Negative pulses of approximately .5 microsecond pulse width and of 5 volts amplitude are used throughout the network.

The operation of the converter is as follows: in the initial condition, the teletypewriter output make and break terminals will be normally closed. This condition holds the movable contact arm of relay 11 at terminal 13, the mark terminal of the relay, putting −6 volts at terminal A of gated amplifier 14. With the teletypewriter terminals open, the relay contact arm snaps over to terminal 12 of relay 11, the space terminal of the relay, applying −6 volts to the input terminal of initial pulse generator 15. Therefore, the message generated by the teletypewriter, in the form of a make and break contact, is changed into space-mark voltage levels by passing through a relay. There are two outputs from the relay: terminal 12, which supplies a "start" space to initial pulse generator 15, and terminal 13, which supplies −6 volts for a mark to enable terminal A of gated amplifier 14.

Assuming that the character Y is generated by the teletype, terminal 13 of the relay has a voltage waveform as shown in 13 of FIGURE 2*a*. In any character generated by the teletypewriter, the first event is a "start" space. The relay contact arm snaps over to terminal 12, putting −6 volts at the input terminal of initial pulse generator 15. This action generates a pulse which feeds into pulse train generating circuit 16; the detailed description and operation of this circuit are the subject of a separate patent application, entitled "Pulse Train Generating Circuit" by William J. Achramowicz, Ser. No. 341,142; filed Jan. 29, 1964.

Each time the relay arm moves over to terminal 12, a pulse is generated by single pulse generator 15. However, only the pulse generated when a "start" space occurs is effective in initiating an output from pulse train generating circuit 16.

There are three outputs from pulse train circuit 16; the first output consists of a single pulse on line 19 which places a "one" in flip-flop SR1 of shift register 20, and a "zero" in all the remaining flip-flops of the shift register. A pulse train of seven pulses appears on lines 17 and 18; the first pulse of the pulse train on line 17 is delayed 11 milliseconds with respect to the pulse on line 19, with each succeeding pulse separated by a 22 ms. interval. The first pulse of the pulse train on line 18 is delayed 22 ms. with respect to the pulse on line 19, with each succeeding pulse also separated by a 22 ms. interval. The time relationship between the pulses on these lines is shown on lines 19, 18, and 17 of FIGURE 2*a*.

The seven pulses on line 17 are called Information Sampling Pulses, since they sample the mark-space gating voltages fed to terminal A of GA14.

Referring to the character Y and its mark-space voltage diagram of line 13, FIGURE 2*a*, during the first 22 ms., there will be a "start" space generated. This will apply −6 volts to Initial Pulse Generator 15, generating the Initial Pulse and disabling terminal A of GA14. The initial pulse occurs at time $t_0$ and puts a "one" into SR1 and "zeroes" in the other six stages of shift register 20. At time $t_{22}$, the first of seven shift pulses appears on line 18, and is applied to the shift bus of the shift register, causing shifting of the contents of the shift register, causing the pattern of flip-flops SR1 to SR7 respectively to become 0, 1, 0, 0, 0, 0, 0. During the second 22 millisecond period, −6 volts is applied through pin 13 of teletype relay 11 to terminal A of GA14, enabling GA14. Since the Information Sampling Pulses on line 17 are timed to fall in the center of the Mark-Space enabling-disabling voltages, they will be either gated or not gated through GA14, according to whether they fall in the center of a mark or a space. Therefore, during this second 22 ms. period, or at time $t_{33}$, a pulse will be gated through GA14, appearing at terminal C of GA14, and causing flip-flop SR1 of shift register 20 to switch to a "one" state, and causing the pattern of the shift register to become 1,1,0,0,0,0,0. At time $t_{55}$, a "zero" is loaded into SR1, and at time $T_{66}$, the pattern is shifted and becomes 0,0,1,1,0,0,0. This action continues until all the Mark-Space information has been loaded into the shift register and shifted down to its proper position. The shift register patterns for any character can be studied with the aid of the following chart:

| Time, (ms.) | Function | Stage | | | | | | |
|---|---|---|---|---|---|---|---|---|
| | | 1 | 2 | 3 | 4 | 5 | 6 | 7 |
| 0 | Load Start Space | 1 | 0 | 0 | 0 | 0 | 0 | 0 |
| 22 | Shift | 0 | 1 | 0 | 0 | 0 | 0 | 0 |
| 33 | Load | 1 | 1 | 0 | 0 | 0 | 0 | 0 |
| 44 | Shift | 0 | 1 | 1 | 0 | 0 | 0 | 0 |
| 55 | Load | 0 | 0 | 1 | 1 | 0 | 0 | 0 |
| 66 | Shift | 0 | 0 | 1 | 1 | 0 | 0 | 0 |
| 77 | Load | 1 | 0 | 1 | 1 | 0 | 0 | 0 |
| 88 | Shift | 0 | 1 | 0 | 1 | 1 | 0 | 0 |
| 99 | Load | 0 | 1 | 0 | 1 | 1 | 0 | 0 |
| 110 | Shift | 0 | 0 | 1 | 0 | 1 | 1 | 0 |
| 121 | Load | 1 | 0 | 1 | 0 | 1 | 1 | 0 |
| 132 | Shift | 0 | 1 | 0 | 1 | 0 | 1 | 1 |
| 143 | Load Stop Mark | 1 | 1 | 0 | 1 | 0 | 1 | 1 |
| 154 | Shift | 0 | 1 | 1 | 0 | 1 | 0 | 1 |

From the chart, it can be seen that at the time of the sixth shift pulse, there is a "one" in SR7, enabling one input to "And" gates 25 to 34, and "And" gate 22. Any information in flip-flops SR's 2–3–4–5–6 will then be transferred as a DC level by use of triple coincidence "And" gates 25 to 34 to Read-in Gated Amplifiers 35 to 39, or 40 to 44. Assuming that switching flip-flop 24 is set so that terminal D is at −6 volts, then "And" gates 25 to 29 will provide an output, and depending on the contents of shift register 20, the information in shift register 20 will be steered to storage register 45. This means that a −6 volt enable voltage will be transferred from SR6, through "And" gate 29, to terminal A of GA39. In a similar manner, a "one" is transferred from SR's 4 to 2 to terminal D of GA's 37 and 35, and since there is a "zero" in SR's 5 and 3, a "zero" is transferred to GA's 38 and 36. This transfer of information takes place at $T=132$ ms., the time of the sixth shift pulse. All during this cycle the information sampling pulses have been feeding into the input terminals B of GA's 35 to 44, but only the seventh pulse is effective and passes through the gated amplifiers since the gated amplifiers are not enabled until time $T=132$ ms. Eleven ms. later at time $T=143$ ms., the seventh information sampling pulse occurs and scans through all the read in gated amplifiers, and since GA's 35, 37, and 39 are enabled, a pulse passes through them and into stages 5A, 3A, and 1A of storage register 45, switching the flip-flops of the storage register, and storing a 1,0,1,0,1 pattern, a Y in register 45. The transfer of information from shift register 20 to storage register 45 is thereby completed.

"Or" gate 21 connected to flip-flops SH2 to SR6 is for the purpose of preventing flip-flop 24 from switching when there is no information in shift register 20. At time $T=154$ ms., the seventh shift pulse passes through GA23 and switches flip-flop 24 to the opposite state, thus transferring an enable to "and" gates 30 to 34 and steering information to storage register 46.

Storage register 45 having been set up with a 1,0,1,0,1 pattern, will enable "Or" gate 63, the output of which in turn will enable one input of "And" gate 65. Up to the present time, the repetition rate of the timing cycle has been 163 ms. From the storage register on through ring counter 62 and output read out gates 47 to 57, the timing cycle repetition rate is 150 ms.

Read-out gates 47 to 56, ring counter 62, and flip-flop 67 work together by a triple coincidence method to perform the function of transferring the information from the storage registers to the output "OR" circuit 57. We will assume that ring counter 62, which is driven by clock pulses from gated amplifier 60, has been running for a short time, which is the case in actual operation. Assume that stage RC1 is enabled, transferring a −6 volt enable voltage directly to the common input of "And" gates 65 and 66, thus enabling one input to these gates. Since we have assumed Y information to be in storage register 45, then "OR" gate 63 will provide an output to the other input of "And" gate 65, causing an enable to appear at the output of gate 65. This enable is passed on from gate 65 to terminal 68 of flip-flop 67, pulling that side of the flip-flop down, and holding it down for the duration of the ring counter cycle. Terminal 68 is thus held at −6 volts for 150 ms.

Each of "And" gates 47 to 56 has three inputs—one input from a stage of the ring counter, another input from a stage of a storage register, and an input from one side of flip-flop 67. When the output terminal of flip-flop RC1 is at −6 volts, terminal 68 switches to −6 volts as described previously. "And" gate 51 will then provide an output, since we have the triple coincidence provided by stage 1A of storage register 45, stage RC1 of ring counter 62, and terminal 68 of flip-flop 67. The output of "And" gate 51 then passes through "OR" gate 57 and appears at terminal 58. Ring counter 62 in its operating cycle will sequentially have stage RC1 at −6 volts for a period of 30 ms. followed by RC2 at −6 volts for 30 ms., continuing through to RC5, and then repeating. When stage RC2 is at −6 volts, there is no triple coincidence applied to "And" gate 50, since stage 2A of storage register 45 is at "0" volts, and therefore no voltage level is transferred to the output. In a similar manner, an output appears at terminal 58 when stages RC3 and RC5 are at −6 volts, but no output occurs when stages RC2 and RC4 are at −6 volts. It can be seen that the message out of terminal 58 will consist of alternate marks and spaces 30 ms. wide, a duplicate of the original message from the teletypewriter except for the difference in timing and the absence of a "start" space and "stop" mark.

When stage RC5 of ring counter 62 switches to −6 volts, then one input of the reset "And" gate 70 and 71 is enabled. Since terminal 68 (which is connected to gate 71) has been enabled during this time, gate 71 will provide an enable output to GA72 allowing the next clock pulse from GA60 to pass through GA72 into the reset input of storage register 45, thus clearing the information out of that register. Thus, we see that information is read into the storage register in parallel at a 163 ms. repetition rate time cycle and read out of the storage registers serially at a 150 ms. repetition rate time cycle.

Clock pulses are fed to GA60 from a master clock; and enable voltage applied at terminal 61 to GA60 is for the purpose of synchronizing the operation of ring counters at both transmitting and receiving ends of the system.

What is claimed is:

1. An electronic code converter for converting a nonsynchronous mark space input signal from a teletypewriter to a synchronous mark space input signal for transmission comprising:

(a) a teletypewriter relay having a first and second output;

(b) a single pulse generator fed by the first output of the teletypewriter relay;

(c) a pulse train generator having a first, second, and third output activated by the output of the single pulse generator;

(d) a relay gated amplifier fed by the first output of the pulse generating circuits and the second output of the teletypewriter relay;

(e) a shift register having a series of shift flip-flops and fed by the output of the relay gated amplifier and reset by the second output of the pulse train generator;

(f) a shift "Or" gate fed by the outputs of the shift flip-flops;

(g) a shift "And" gate fed by the shift "Or" gate and the first shift flip-flop;

(h) a shift gated amplifier enabled by the shift "And" gate and fed by the third output of the pulse train generator;

(i) a first control flip-flop triggered by the shift gated amplifier;

(j) a first and second storage register, each storage register having a bank of storage flip-flops;

(k) a plurality of read-in gated amplifiers one each feeding one of the storage flip-flops, the read-in gated amplifiers being fed by the first output of the pulse train generator;

(l) a plurality of read-in "And" gates one each feeding one of the read-in gated amplifiers, the read-in "And" gates being fed by the storage flip-flops and the outputs of the first control flip-flop;

(m) first and second storage register "Or" gates fed by the outputs of the first and second storage registers respectively;

(n) a ring counter driven by clock pulses;

(o) first and second ring counter "And" gates fed by the first and second storage register "Or" gates respectively and the last stage of the ring counter;

(p) a second control flip-flop having a pair of input terminals, a pair of output terminals, and fed by the first and second ring counter "And" gates;

(q) third and fourth ring counter "And" gates fed by the pair of output terminals of the second control flip-flop and the first stage of the ring counter;

(r) first and second reset gated amplifiers fed by clock pulses and enabled by the outputs of the third and fourth ring counter "And" gates, the outputs of the first and second reset gated amplifiers being reset pulses for the first and second storage registers respectively;

(s) a plurality of read-out "And" gates one each being fed by the outputs of the storage flip-flop, successive stages of the ring counter, and the second control flip-flop;

(t) and an output "Or" gate fed by the outputs of the readout "And" gates.

References Cited

UNITED STATES PATENTS

| | | | |
|---|---|---|---|
| 2,373,970 | 4/1945 | Mathes | 178—17.5 |
| 2,879,332 | 3/1959 | Reek et al. | 178—26.5 |
| 2,903,513 | 9/1959 | Phelps et al. | 178—17.5 |

THOMAS A. ROBINSON, *Primary Examiner.*